United States Patent
Boers et al.

(10) Patent No.: US 7,808,930 B2
(45) Date of Patent: Oct. 5, 2010

(54) DYNAMIC MULTIPOINT TREE REARRANGEMENT

(75) Inventors: Arjen Boers, Sitges (ES); Ijsbrand Wijnands, Leuven (BE); Lorenzo Vicisano, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 11/258,640

(22) Filed: Oct. 26, 2005

(65) Prior Publication Data

US 2007/0091827 A1   Apr. 26, 2007

(51) Int. Cl.
*H04L 12/28* (2006.01)
(52) U.S. Cl. .................. 370/256; 370/390; 370/432
(58) Field of Classification Search ................ 370/254, 370/255, 390, 432, 216–228
See application file for complete search history.

(56) References Cited

U.S. PATENT DOCUMENTS

| | | | |
|---|---|---|---|
| 5,325,362 A | 6/1994 | Aziz | 370/405 |
| 6,147,970 A | 11/2000 | Troxel | 370/235 |
| 6,185,210 B1 | 2/2001 | Troxel | 370/395.32 |
| 6,385,647 B1 | 5/2002 | Willis et al. | 709/217 |
| 6,415,323 B1 | 7/2002 | McCanne et al. | 709/225 |
| 6,484,257 B1 | 11/2002 | Ellis | 713/153 |
| 6,580,722 B1 | 6/2003 | Perlman | 370/432 |
| 6,584,082 B1 | 6/2003 | Willis et al. | 370/316 |
| 6,633,835 B1 | 10/2003 | Moran et al. | 702/190 |
| 6,654,796 B1 | 11/2003 | Slater et al. | 709/220 |
| 6,701,361 B1 | 3/2004 | Meier | 709/224 |
| 6,732,189 B1 | 5/2004 | Novaes | 709/249 |
| 6,735,200 B1 | 5/2004 | Novaes | 370/390 |
| 6,791,981 B1 | 9/2004 | Novaes | 370/390 |
| 6,801,940 B1 | 10/2004 | Moran et al. | 709/224 |
| 6,804,492 B2 | 10/2004 | Kay | 455/12.1 |
| 6,831,898 B1 * | 12/2004 | Edsall et al. | 370/256 |
| 6,915,340 B2 * | 7/2005 | Tanaka | 709/220 |
| 7,453,873 B1 * | 11/2008 | Takefman et al. | 370/389 |
| 2001/0024443 A1 | 9/2001 | Alriksson et al. | 370/401 |
| 2001/0037472 A1 * | 11/2001 | Li | 714/4 |
| 2002/0004843 A1 | 1/2002 | Andersson et al. | 709/238 |
| 2002/0012320 A1 | 1/2002 | Ogier | 370/466 |
| 2002/0023164 A1 | 2/2002 | Lahr | 709/231 |
| 2002/0031107 A1 | 3/2002 | Li et al. | 370/338 |
| 2002/0046287 A1 | 4/2002 | La Porta et al. | 709/230 |
| 2002/0062388 A1 | 5/2002 | Ogier et al. | 709/238 |
| 2002/0075807 A1 | 6/2002 | Troxel et al. | 370/238 |
| 2002/0075866 A1 | 6/2002 | Troxel et al. | 370/389 |
| 2002/0078127 A1 | 6/2002 | Troxel | 709/201 |
| 2002/0078238 A1 | 6/2002 | Troxel et al. | 709/245 |
| 2002/0085498 A1 | 7/2002 | Nakamichi et al. | 370/239 |
| 2002/0147011 A1 | 10/2002 | Kay | 455/427 |

(Continued)

*Primary Examiner*—Chirag G Shah
*Assistant Examiner*—Daniel Mitchell
(74) *Attorney, Agent, or Firm*—Campbell Stephenson, LLP

(57) ABSTRACT

A mechanism to dynamically map a multicast session to a transport tree to reduce flooding of egress routers on the transport tree is provided. A mechanism to reduce the length of time in which transient flooding can occur while the transport tree is being chosen or configured is also provided. The disclosed dynamic mapping mechanisms avoid interruption of an established multicast session. One mechanism disclosed provides for remapping of a multicast session by cloning an original transport tree with which the multicast session is associated, associating the multicast session with the cloned transport tree, and then reconfiguring the cloned transport tree in accord with edge egress routers that have subscribers to that multicast session.

17 Claims, 11 Drawing Sheets

U.S. PATENT DOCUMENTS

| | | | |
|---|---|---|---|
| 2002/0172155 A1 | 11/2002 | Kasvand-Harris et al. | 370/229 |
| 2002/0184368 A1 | 12/2002 | Wang | 709/226 |
| 2003/0002444 A1* | 1/2003 | Shin et al. | 370/238 |
| 2003/0037109 A1 | 2/2003 | Newman et al. | 709/201 |
| 2003/0051048 A1 | 3/2003 | Watson et al. | 709/238 |
| 2003/0053457 A1 | 3/2003 | Fox et al. | 370/390 |
| 2003/0063608 A1 | 4/2003 | Moonen | 370/390 |
| 2003/0067928 A1 | 4/2003 | Gonda | 370/401 |
| 2003/0074584 A1 | 4/2003 | Ellis | 703/201 |
| 2003/0105865 A1 | 6/2003 | McCanne et al. | 709/223 |
| 2003/0110288 A1 | 6/2003 | Ramanujan et al. | 709/238 |
| 2003/0147405 A1 | 8/2003 | Khill | 370/401 |
| 2003/0152063 A1 | 8/2003 | Giese et al. | 370/349 |
| 2003/0165140 A1 | 9/2003 | Tang et al. | 370/393 |
| 2003/0172145 A1 | 9/2003 | Nguyen | 709/223 |
| 2003/0174706 A1 | 9/2003 | Shankar et al. | 370/393 |
| 2003/0179742 A1 | 9/2003 | Ogier et al. | 370/351 |
| 2003/0200307 A1 | 10/2003 | Raju et al. | 709/224 |
| 2003/0212821 A1 | 11/2003 | Gillies et al. | 709/238 |
| 2004/0025018 A1 | 2/2004 | Haas et al. | 713/168 |
| 2004/0037279 A1 | 2/2004 | Zelig et al. | 370/390 |
| 2004/0054799 A1 | 3/2004 | Meier et al. | 709/230 |
| 2004/0062267 A1 | 4/2004 | Minami et al. | 370/463 |
| 2004/0103282 A1 | 5/2004 | Meier et al. | 713/171 |
| 2004/0133619 A1 | 7/2004 | Zelig | 709/200 |
| 2004/0165600 A1 | 8/2004 | Lee | 370/395.53 |
| 2004/0205215 A1 | 10/2004 | Kouvelas et al. | 709/231 |
| 2005/0226167 A1* | 10/2005 | Braun et al. | 370/254 |
| 2006/0067247 A1* | 3/2006 | Rajan | 370/254 |
| 2006/0221859 A1* | 10/2006 | Bijwaard et al. | 370/254 |
| 2006/0256712 A1* | 11/2006 | Imajuku et al. | 370/218 |
| 2007/0291772 A1* | 12/2007 | Andersson et al. | 370/400 |

* cited by examiner

DYNAMIC MULTIPOINT TREE REARRANGEMENT

FIELD OF THE INVENTION

This invention relates to the field of information networks, and more particularly relates to mapping multicast sessions to transport network transport trees in a manner that avoids persistent multicast flooding on transport network edge routers and minimizes length of transient flooding when a multicast subscriber node is removed from a multicast session.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase.

As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's transport network to provide connectivity between the disparate geographic sites of the business' network elements. In order for the business' network to seamlessly function through the provider network, the provider network must be able to provide a medium for transmission of all the business' various types of datastreams, including multicast transmission.

Multicast routing protocols enable multicast transmission (i.e., one-to-many connections and many-to-many connections) by replicating a multicast packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether downstream subscribers to the multicast packet (i.e., members of the multicast group) are connected to the network node (either directly or indirectly). The network node can then replicate the multicast packet as needed and transmit the replicated packets to any connected subscribers.

FIG. 1A is a simplified block diagram of a network transporting a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes network elements 112, 121, 131, 132 and 141. A multicast datastream, having a group destination address to which the above network elements have subscribed as receiver members, is transmitted from network element 111 to network router element 110 (illustrated by the arrow from 111 to 110). Network router element 110 determines where to forward packets in the multicast datastream by referring to an internal address table that identifies each port of network router element 110 that is coupled, directly or indirectly, to a subscribing member of the multicast group. Network router element 110 then replicates packets of the multicast datastream and then transmits the packets from the identified ports to network element 112, network router element 120 and network router element 130.

Network router elements 120 and 130 can inform network router element 110 that they are coupled to a subscribing member of a multicast datastream using, for example, a protocol independent multicast (PIM) multicast message. Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a membership report request through a software protocol such as internet group management protocol (IGMP). When a network element wishes to subscribe to a multicast transmission, an IGMP membership request frame can be transmitted by the network element. An IGMP-enabled network router element (or a L2 network device) can have "snooping" software executing to read such a frame and build a corresponding entry in a multicast group address table.

Upon receipt by network router elements 120 and 130, packets from the multicast datastream will be replicated as needed by those network router elements to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bidirectional version of protocol independent multicast (PIM bidir) is used to configure the network router elements in the multicast tree. In such bidirectional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through such a rendezvous point, establishes a loop-free tree topology with a root at the rendezvous point. In FIG. 1B, the rendezvous point is illustrated as network router element 110.

FIGS. 1A and 1B illustrate transmission of multicast datastreams in a network in which the network router elements 110, 120, 130 and 140 are directly coupled with one another. But, as stated above, as a business and its network grow, a business' network elements can become geographically diverse, and therefore the path over which the datastream must flow can include an intervening third-party provider transport network.

FIG. 2 is a simplified block diagram illustrating a network configuration in which geographically diverse subnets of a business' network are coupled through a provider transport network. The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the providers' network, a network router element on the edge of the business' network (a customer edge router) is coupled to a network router element on the edge of the provider's network (a provider edge router). In FIG. 2, customer edge router elements 250 (1-3) are coupled to provider edge router elements 260 (1-3), respectively. Network router element 240 is coupled to provider edge router element 260 (4) (that is, network router element 240 is configured as a customer edge router).

It should be noted that the customer edge router and the provider edge router functionality can be provided by a single router. Further, a network router element such as 240 can also serve as an edge router. The provider edge routers provide access to the provider's transport network which can contain data transmission lines, network router elements, and OSI Level 2 network devices to aid in the transmission of data from one provider edge router to another provider edge router. The provider transport network illustrated in FIG. 2 contains, as an example, network router elements 270(1-5) and 270(r), which are coupled in a manner to permit transmission of packets through the transport network. Such network router elements internal to a transport network are called "core router elements" or "core routers." A provider transport network is not limited to such a configuration, and can include any number of network router elements, transmission lines, and other L2 and L3 network devices.

In order to facilitate transmission of data through the provider transport network, the transport network can utilize different protocols from those used in coupled customer networks. Such transport network protocols can permit faster data transmission and routing through the network. Any needed translation between customer and provider transport network protocols can be performed by the edge routers.

FIG. 3A is a simplified block diagram illustrating another representation of a transport network. It should be understood that the term "transport network" corresponds to any network of coupled network router elements comprising edge network router elements and core network router elements as those terms are understood in the art. FIG. 3A illustrates a set of edge router elements PE 310, 320, 330 and 335. These edge router elements are connected by a network including core routing elements P 340 and P 350. Using transport network protocols, such as MPLS, a datastream can be transmitted from any of the edge router elements to any other edge router element via core router elements in the transport network. A datastream can also be transmitted from one of the edge router elements to a plurality of other edge router elements via a configured path through the core of the transport network; such a configured point-to-multipoint path is called a transport tree.

FIG. 3B is a simplified block diagram illustrating a transport tree configured in the transport network. Edge router PE 310 is configured as an ingress router to the transport network, while edge routers PE 320 and PE 330 are egress routers for a datastream to exit the transport network. Datastream packets can flow through the transport network core routers P 340 and P 350, which can transmit and replicate packets, as necessary. As ingress router PE 310 receives datastream packets destined for the transport tree, PE 310 can add to the packets a transport tree identifier that identifies the transport tree over which the packets should flow. Core routers P 340 and P 350 can use this transport tree identifier to locally direct datastream packets to one or more downstream nodes in the transport tree. The transport tree identifier can be included in datastream packets as a label or, in one embodiment of the present invention, in an FEC field of the packet. In a typical transport network, core routers can retain state information for a transport tree identifier (a transport tree state) that includes an identity of an upstream router element and one or more downstream router elements. Using such a transport tree state, core router elements contain only local knowledge related to a transport tree and not knowledge of each transport tree node.

FIG. 3C illustrates an association of a multicast session with the transport tree illustrated in FIG. 3B. A point-to-multipoint multicast session is typically identified by a (S, G) tuple representing a source address and a group destination address for the multicast session. Similarly, a multipoint-to-multipoint multicast session is typically identified by a (RP, G) tuple representing a rendezvous point address and a group destination address. As stated above, when a network element wishes to subscribe to a multicast transmission, the network element can transmit a JOIN session request. Such a request can include the identifying tuple of the multicast session. In FIG. 3C, subscriber nodes R1 and R2 are coupled to edge router elements PE 320 and PE 330, respectively, while a source for the multicast data stream S1 is coupled to edge router element PE 310.

Upon receiving a join request (e. g., IGMP or PIM), an edge router element coupled to the requesting network element (an egress router element) can determine the identity of an edge router element coupled to a network including the identified source of the multicast data stream (an ingress router element). Once such an identification is made, the egress router element can notify the ingress router element that the egress router element is coupled to a requesting subscriber of the multicast session. The ingress router element can then respond to the notification of the requesting subscriber by creating a transport tree that spans the transport network from ingress to egress router elements or associating the notifying egress router element with an already existing transport tree and modifying that existing transport tree to include the egress node if necessary. Once such a transport tree decision has been made by the ingress router element, the ingress router element will provide the notifying egress router element of an association between the multicast session and the identifier of the transport tree along which the ingress router element will transmit data packets from the requested multicast datastream. In such a manner, a multicast session can be associated with a transport tree through a transport network.

FIG. 3D is a simplified block diagram illustrating multicast flooding on a transport tree through a transport network. In FIG. 3D, two different multicast sessions share the same transport tree, wherein the transport tree is the same as that described for FIG. 3C. Multicast session SI is received by ingress router PE 310 and provided to egress routers PE 320 and PE 330 through the transport network core. Network elements R1 and R2 subscribe to session S1. Multicast session S2 is likewise transmitted through the transport tree and is received by subscribers R3 and R4 coupled to PE 320 and PE 330, respectively. Should network element R2 opt to no longer subscribe to multicast session S1, edge router PE 330 will no longer have a subscriber to multicast session S1. If PE 330 continues to receive datastream packets for multicast session S1, then PE 330 will drop those packets. Such receiving of unnecessary packets results in wasted bandwidth on the core network and overhead processing by PE 330 to analyze and drop unnecessary packets. Such a state in which edge routers that are members of a transport tree are receiving multicast datastream packets for which the edge routers do not have a corresponding subscriber node is called "flooding." Due to this consumption of network resources, flooding is an undesirable situation.

An obvious way to avoid flooding is to have a one-to-one correlation between multicast sessions and transport trees. Therefore, each multicast session would have its own transport tree and the selection of egress routing elements would always correspond to the multicast session. A drawback of this approach is that the number of transport trees can grow linearly with the number of multicast sessions. Since each edge and core router element in a transport network retains state information related to the transport trees transiting that router element, scalability problems can result in the transport network. Such scalability problems include costs related to maintaining label and state space in the router elements, where those costs include memory, processing cycles expended during table lookups, and administration of the network. Such scalability issues are avoided, at least in part, by having multicast sessions share transport trees where appropriate.

It is therefore desirable to have a method by which to dynamically map a multicast session to a transport tree in order to avoid persistent flooding of egress routers and minimizes the amount of transient flooding during the dynamic mapping, while at the same time avoiding interruption of multicast session datastream packets for established sessions.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism to dynamically map a multicast session to a transport tree to reduce flooding of egress routers on the transport tree. The present invention further reduces the length of time in which transient flooding can occur while the transport tree is being chosen or configured. The present invention further avoids interruption of an established multicast session. An embodiment of the present invention provides for remapping of a multicast session by cloning an original transport tree with which the multicast session is associated, associating the multicast session with the cloned transport tree, and then reconfiguring the cloned transport tree in accord with edge egress routers that have subscribers to that multicast session.

Figure 1A:
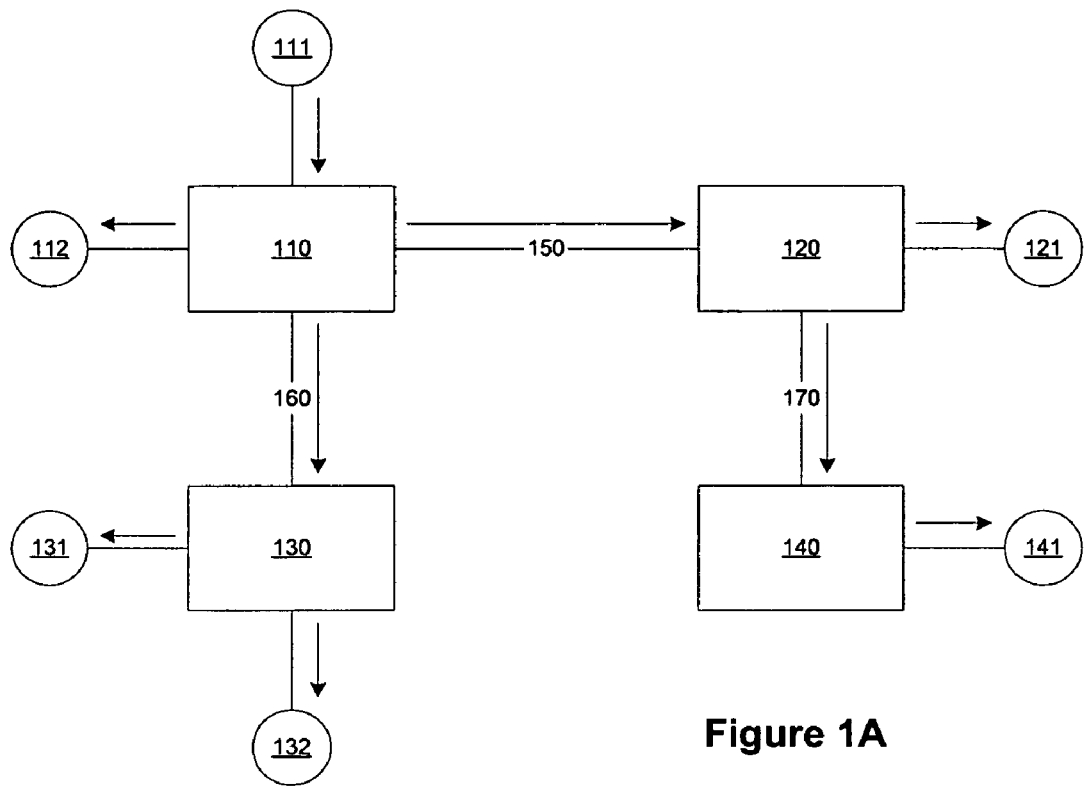
FIG. 1A is a simplified block diagram of a network transporting a multicast transmission.
Figure 1B:
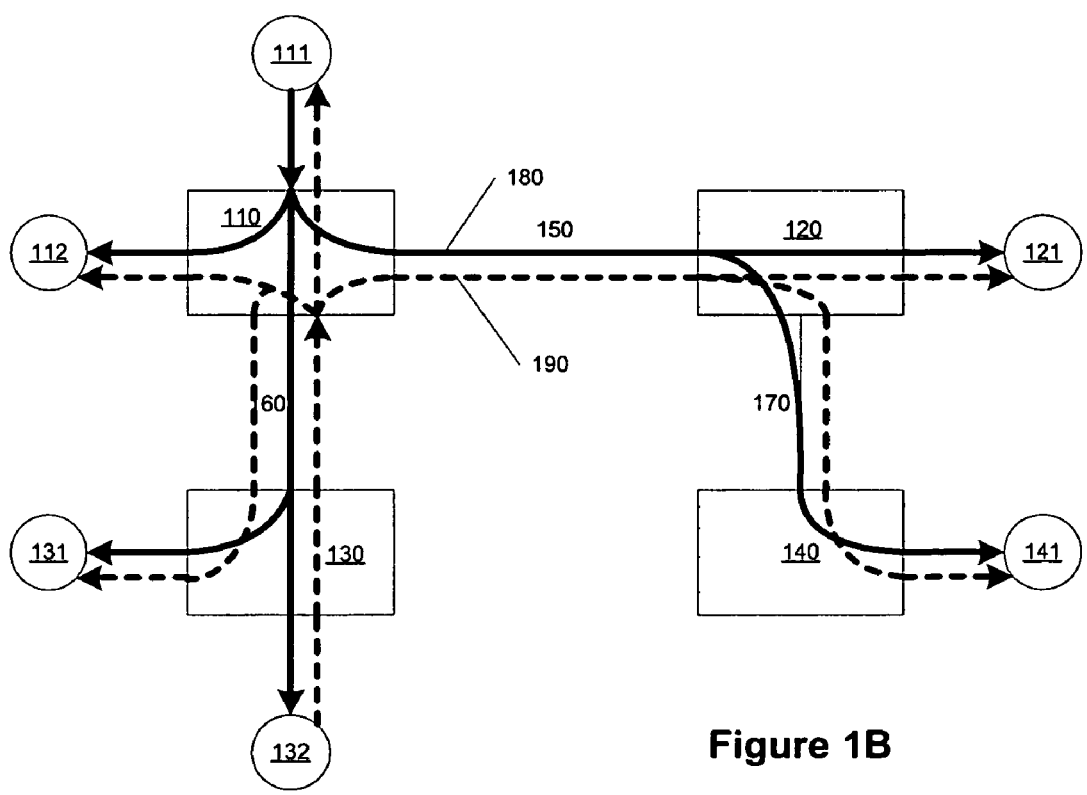
FIG. 1B is a simplified block diagram of a network in which multiple sources are transmitting to a multicast group.
Figure 2:
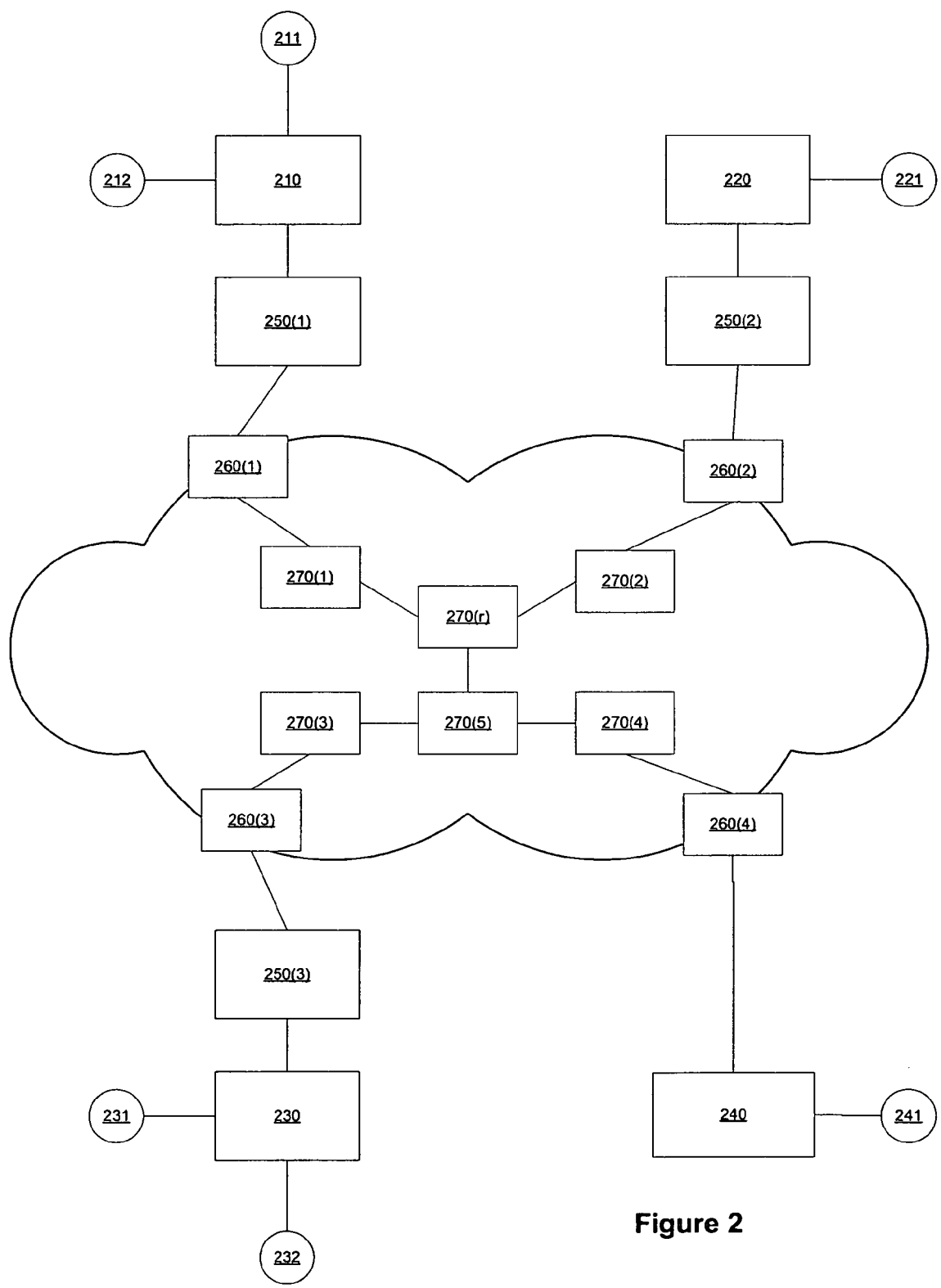
FIG. 2 is a simplified block diagram illustrating a network configuration in which geographically diverse subnets of a business' network are coupled through a provider transport network.
Figure 3A:
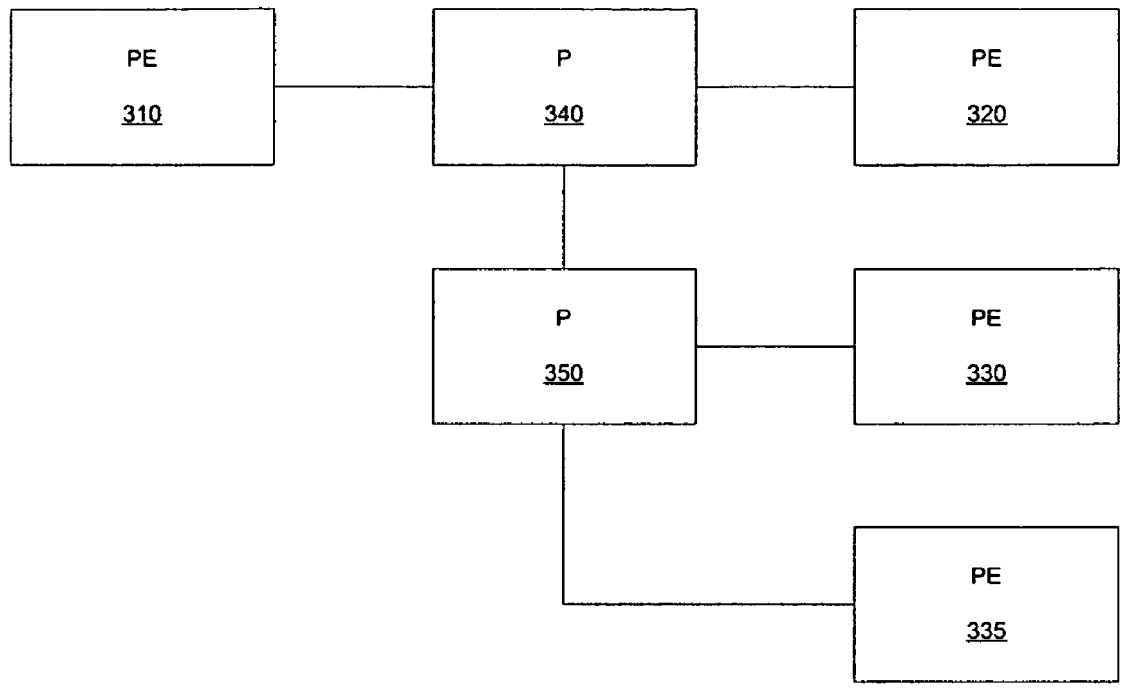
FIG. 3A is a simplified block diagram illustrating one embodiment of a transport network.

Embodiments of the present invention are configured to operate in transport networks such as the transport network illustrated in FIG. 3A. Transport networks employing the present invention are assumed to include a transport tree construction protocol that allows for dynamically building new transport trees and modifying egress router element fan out of an existing tree. Such a protocol can either be egress initiated (egress router elements perform tree maintenance in a distributed fashion by joining and leaving the tree), or ingress initiated (an ingress or root node maintains the tree in a centralized fashion by initiating addition and removal of ingress nodes). Such a construction protocol will typically include a mechanism to notify the ingress node when an action on the transport tree is successfully executed and the tree is ready to deliver traffic to its new set of egress router elements. Although the discussion uses the term "ingress node" or "ingress router", it should be noted that operations initiated or carried out by an ingress router can also be performed by a root node or root router element of a transport tree.

The transport network architecture is also assumed to include a signaling protocol that permits ingress and egress router elements to exchange information such as a notification of a multicast session change by an egress router, notification of a modification to a transport tree, or notification of associating a multicast session with a transport tree. Such a message exchange protocol can permit an ingress router element to track membership information for multicast sessions in terms of egress nodes, membership information for transport trees in terms of egress nodes, and a mapping between multicast sessions and transport trees. Egress router elements can track information related to multicast sessions transiting through the egress router element, identification of transport trees of which the egress router element is a member, and a mapping between the transited multicast sessions and the transport trees of which the egress router element is a member.

Figure 3B:
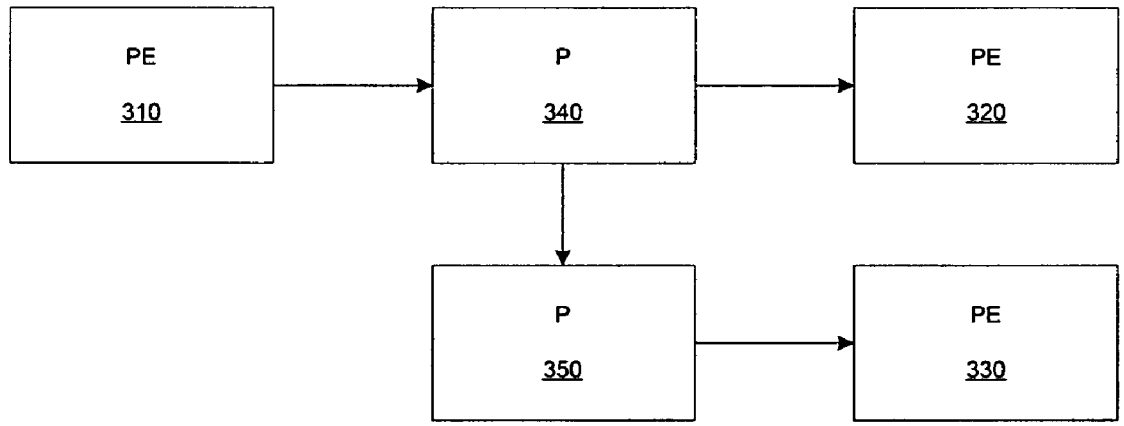
FIG. 3B is a simplified block diagram illustrating a transport tree configured in a transport network.
Figure 3C:
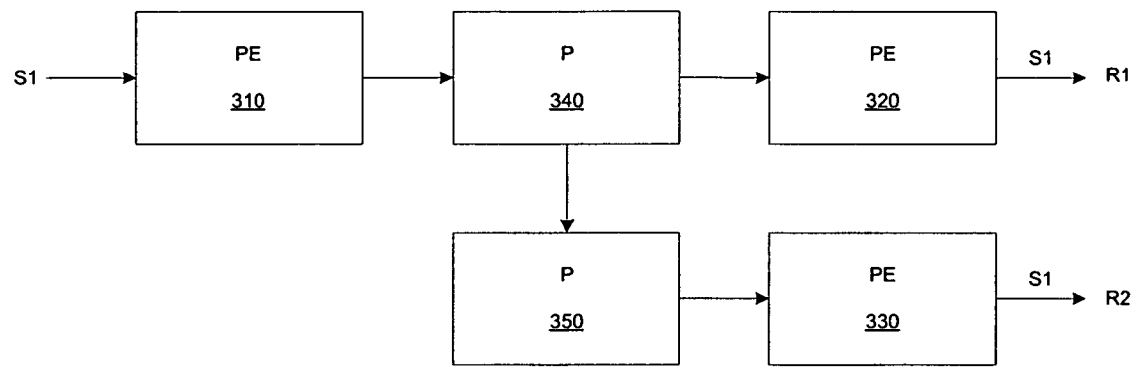
FIG. 3C illustrates an association of a multicast session with the transport tree.
Figure 3D:
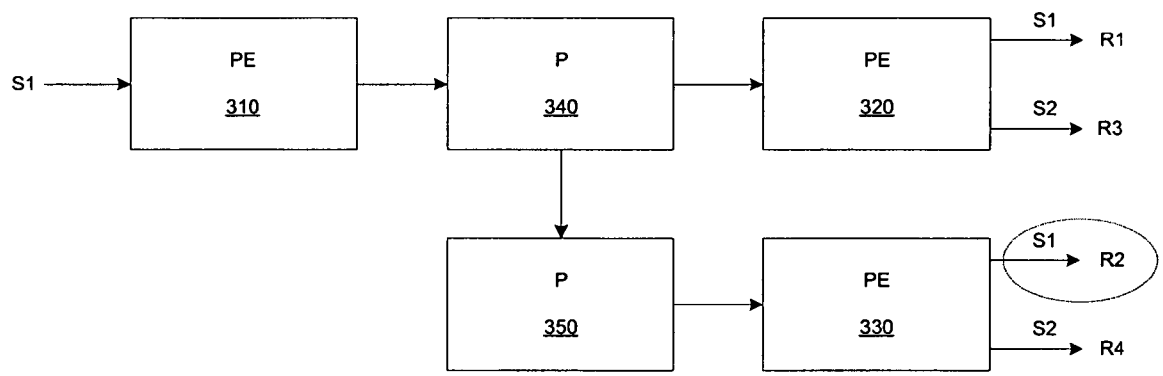
FIG. 3D is a simplified block diagram illustrating multicast flooding on a transport tree through a transport network.

An additional feature of a transport network architecture is a means for demultiplexing multicast sessions from a transport tree. Since a transport tree can carry multiple multicast sessions, as in FIG. 3D, egress router elements can have a mechanism to demultiplex each session received from a transport tree so that the egress router element can forward or drop data stream packets from that session as appropriate. Typically, a session identifier such as the (S, G) tuple or just the group address is sufficient information for such demultiplexing. In a VPN environment, multicast session identifiers are not necessary unique and therefore additional information may be required to identify the corresponding VPN for a multicast session. A VPN identifier, such as a label, can be included in packets transmitted along the transport tree and the VPN identifier can be parsed by an egress router element to determine the appropriate VPN. For such labels, a negotiation must occur between ingress and egress router elements so that both ends of the transport tree interpret the labels correctly. Similarly, other types of labels can be inserted into packets transiting the transport tree to aid in multiplexing; such labels would also need to be negotiated between the ingress and egress router elements.

As indicated above, an ingress router element has information related to egress router elements that are members of transport trees rooted at the ingress router element and information related to egress router elements that are subscribers to multicast sessions passing through the ingress router element. In order to transport a multicast datastream across the transport network, the ingress router associates the multicast session with a transport tree.

When the ingress router element receives a multicast session JOIN or PRUNE request that changes egress router membership of a multicast session, the ingress router element can perform a check to determine whether that multicast session was the only multicast session mapped to a corresponding transport tree. Based on the result of that check, the ingress router element determines a course of action to respond to the multicast session JOIN/PRUNE request. If the affected multicast session was the only multicast session mapped to an existing transport tree, then the ingress router element can perform steps resulting in a fan-out modification of the transport tree. Such a fan-out modification can be either a reduction of the transport tree by eliminating an egress router element coupled to a departing subscriber or adding an egress router element coupled to a new subscriber network element.

If the affected multicast session shares the transport tree with other multicast sessions, then the ingress router element can perform a check to determine if another existing transport tree has the exact egress router fan out required to transport the modified multicast session. If there is an existing transport tree that matches the new egress router fan out, then the ingress router element remaps the affected multicast session to the existing transport tree that matches the new fan out. If there is not an existing transport tree that matches the new fan out, the ingress router element can create a new transport tree that matches the new fan out, and then remaps the affected multicast session to the new transport tree. Each of these scenarios is discussed below.

Figure 4:
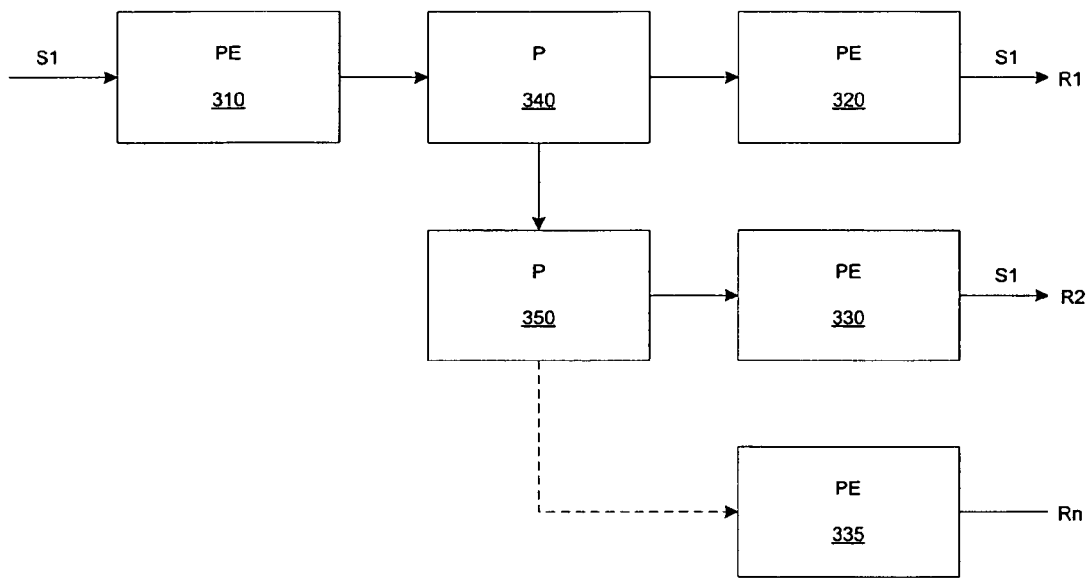
FIG. 4 is simplified block diagram illustrating a modification of an existing transport tree in accord with one embodiment of the present invention.

FIG. 4 is simplified block diagram illustrating a modification of an existing transport tree in accord with one embodiment of the present invention. FIG. 4 illustrates the transport network of FIG. 3A with edge router elements PE 310, PE 320, and PE 330 and core router elements P 340 and P 350 included in a transport tree similar to that illustrated in FIG. 3B. A multicast session S1 enters the transport network at ingress router PE 310 and exits the transport network at egress routers PE 320 and PE 330, which are coupled to subscriber nodes R1 and R2, respectively. Edge router PE 335 receives a multicast session JOIN request for session S1 from network element Rn. In response to such a request, PE 335 provides a notification of the multicast session JOIN request to ingress router PE 310.

In the scenario illustrated in FIG. 4, multicast session S1 is the only multicast session mapped to the transport tree. In response to the multicast session JOIN notification, ingress router element PE 310 can provide an identifier for the transport tree and any necessary demultiplexing information to the newly added egress router element PE 335. In addition, depending upon a transport tree building protocol for the transport network, either the ingress router or the egress router triggers an update in the fan out of the transport tree. For example, egress router PE 335 can provide to core router P 350 a transport tree construction protocol message that results in adding PE 335 to the outgoing state of the identified transport tree. Once the transport tree fan out modification is complete, PE 335 will receive datastream packets for multicast session S1, which PE 335 can then transmit to subscriber network Rn.

Figure 5:
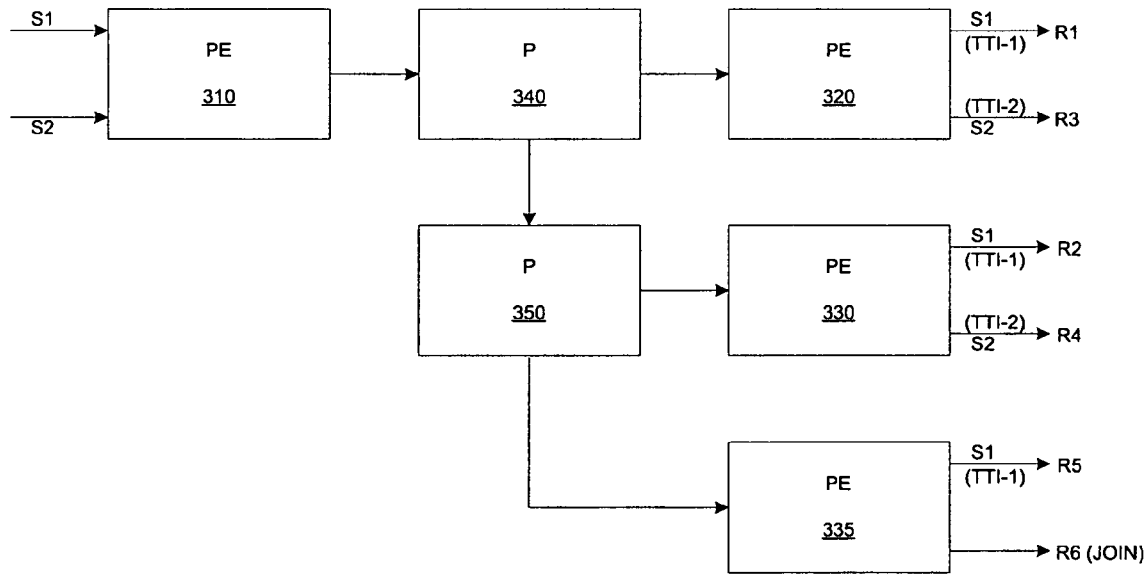
FIG. 5 is a simplified block diagram illustrating a transport network supporting two transport trees SI and S2, wherein a remapping operation can be performed in accord with one embodiment of the present invention.

FIG. 5 is a simplified block diagram illustrating the transport network of FIG. 3A supporting two transport trees S1 and S2, wherein a remapping operation can be performed in accord with one embodiment of the present invention. Multicast session S1 has subscriber network elements R1, R2, and R5 coupled to egress router elements PE 320, PE330, and PE 335, respectively. The transport tree including PE 310 as an ingress router element and PE 320, PE 330, and PE 335 as egress router elements is identified as TTI-1. Multicast session S2 initially has subscriber network elements R3 and R4 coupled to egress router elements PE 320 and PE 330, respectively. A transport tree including PE 310 as an ingress router element and PE 320 and PE 330 as egress router elements is identified as TTI-2. In such a configuration, a remapping scenario can involve a network element R6 coupled to PE 335 providing a multicast session JOIN request for multicast session S2. PE 335 provides notification of the multicast session JOIN request to ingress router PE 310, which then determines whether an existing transport tree is present that includes the egress router elements that are currently members of TTI-2 as well as the new egress router element PE335. As illustrated, existing transport tree TTI-1 meets that criteria.

In response to the multicast session JOIN notification and the determination of an existing transport tree, ingress router PE 310 can inform each of the egress nodes for transport tree TTI-1 of a new mapping of multicast session S2 to TTI-1. Such a notification can be performed through the signaling protocol described above. The egress router elements can then process this message (e.g., creating appropriate states for processing datastream packets related to the multicast session). Once the egress router elements have completed processing, both the TTI-1 and TTI-2 transport trees are configured to transmit datastream packets for multicast session S2. The egress router elements can then provide an acknowledgement to the ingress router element that the processing has been completed, thereby indicating that they are able to receive multicast session S2 packets on transport tree TTI-1. Once the ingress router element has received acknowledgement from each egress router member of transport tree TTI-1, the ingress router element can redirect datastream packets for multicast session S2 onto transport tree TTI-1. Once the multicast datastream has been remapped to TTI-1, the ingress node can then reply to the initial multicast session JOIN request by informing egress router PE 335 of the mapping of multicast session S2 to TTI-1 and any details necessary to set up a new demultiplexing state, if needed. The ingress node can then inform all egress nodes that the old mapping of multicast session S2 with TTI-2 is not in use anymore, thereby allowing the egress router elements to remove the mapping of multicast session S2 from transport tree TTI-2.

FIGS. 6A-6D are simplified block diagrams illustrating a process for cloning and modifying a transport tree in response to a request to modify a multicast session fan out. In this scenario, there is an assumption that multiple multicast sessions (S1 and S2) are using one transport tree (TTI-1). The ingress router receives a request to modify the fan out of one of the multicast sessions (S1), but the fan out of the other multicast session (S2) remains the same. Further, there are no other existing transport trees that match the fan out of the modified multicast session (S1).

One possible response to such a scenario is to create a new transport tree for modified multicast session S1 and remap that session to the new tree. Such an approach has the drawback that the ingress node may not be able to discern when the newly built transport tree contains all egress nodes that it should have. This is due to the distributed nature of egress-initiated tree-building protocols, where no router in the transport network has a complete view of the full state of a transport tree. If the ingress router element remaps the multicast session to the new tree before some of the egress router elements have joined, those egress router elements would experience service disruption. The clone/modify process illustrated in FIGS. 6A-6D avoids this service disruption problem by performing the cloning of the transport tree in an atomic way so that the ingress router element will not perform the remapping until all the egress router elements are guaranteed to have joined. As shown below, as each node in the transport tree clones its replication state, the node waits for all downstream neighbors of the original transport tree to join the new cloned tree.

Figure 6A:
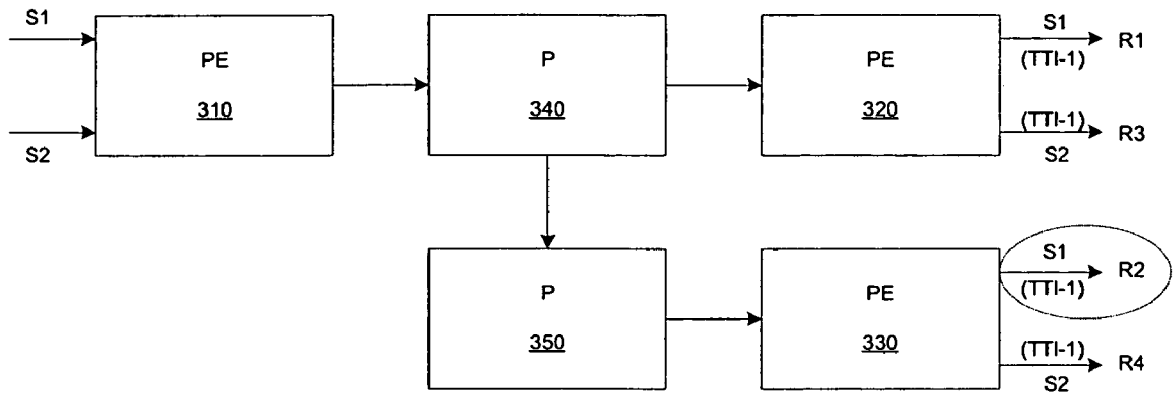
FIGS. 6A-6D are simplified block diagrams illustrating a process for cloning and modifying a transport tree in response to a request to modify a multicast session fan out in accord with one embodiment of the present invention.

FIG. 6A illustrates an initial state in which multicast sessions S1 and S2 share a transport tree identified as TTI-1. TTI-1 includes ingress router element PE 310, egress router elements PE 320 and PE 330, and core router elements P 340 and P 350. Multicast session S1 has subscriber network elements R1 and R2 coupled to egress router elements PE 320 and PE 330, respectively. Multicast session S2 has subscriber network elements R3 and R4 coupled to egress router elements PE 320 and PE 330, respectively. R2 issues a multicast session PRUNE request to egress router PE 330 (e. g., removing itself as a subscriber to S1). In response, PE 330 notifies ingress router PE 310 with a notification of the pruning. Ingress router PE 310 can then determine that no existing transport tree matches the new fan-out for S1.

In response to such a determination, ingress router PE 310 can initiate a cloning process by issuing a transport tree JOIN notification (via the signaling protocol) to all egress router elements that are members of the TTI-1 transport tree. Such a transport tree JOIN notification can specify the multicast session identifier, a new transport tree identifier (TTI-2), and any needed multiplexing information. If the transport network tree building protocol is egress initiated, reception of such a transport tree JOIN notification triggers a start of the tree cloning process at each egress node. Egress nodes will be prompted to start the tree cloning process because the transport tree JOIN notification carries a transport tree identifier of a new tree (TTI-2) and the session key of an existing multicast session.

Figure 6B:
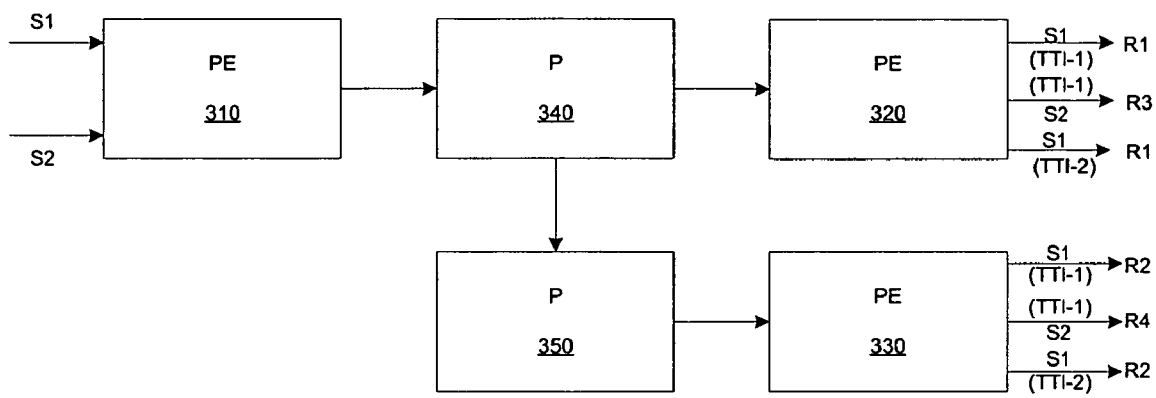

FIG. 6B is a simplified block diagram illustrating a result of the cloning process for the network in FIG. 6A. A new transport tree identified as TTI-2 includes all of the egress router elements that are members of TTI-1. The mechanism for building such a tree is discussed in more detail below. Once transport tree TTI-2 is configured, the egress router elements can receive multicast session S1 on either TTI-1 or TTI-2. This ability avoids data loss during a switchover from TTI-1 to TTI-2. While FIG. 6B illustrates both TTI-1 and TTI-2 associated with multicast session S1, TTI-1 and TTI-2 do not both carry S1 data at the same time. Once configuration of TTI-2 is complete, ingress router element PE 310 can divert multicast session S1 data to the new transport tree and can send a leave notification to all the TTI-1 egress nodes that the old mapping is not in use anymore.

Figure 6C:
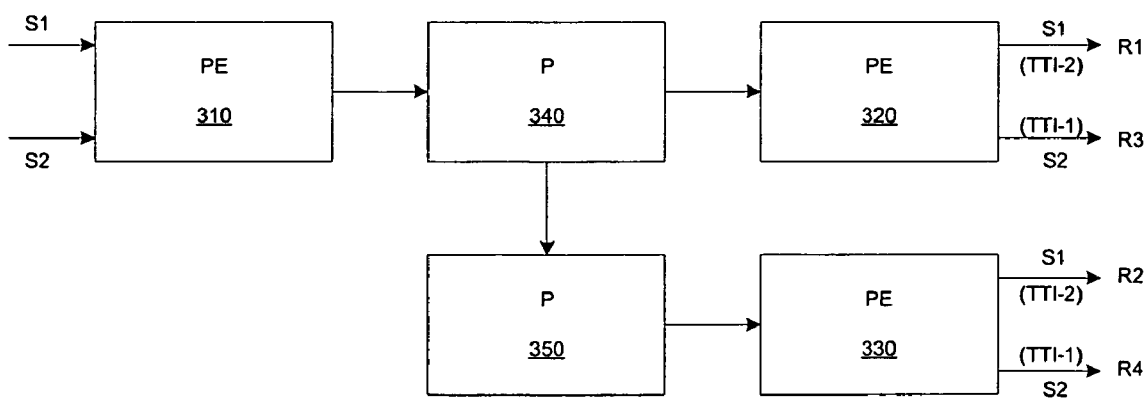

FIG. 6C is a simplified block diagram illustrating the results of redirecting the multicast datastream to the cloned transport tree of FIG. 6B. Multicast session S1 is now mapped to transport tree TTI-2 and is received by egress routers PE 320 and PE 330 coupled to subscriber nodes R1 and R2, respectively. Ingress router PE 310 can then modify transport tree TTI-2 to conform with the leave notification of PE 330 that was transmitted in response to the original multicast session PRUNE request. In this scenario, egress router element PE 330 is removed from transport tree TTI-2 in a manner similar to that discussed above for modifying a transport tree.

Figure 6D:
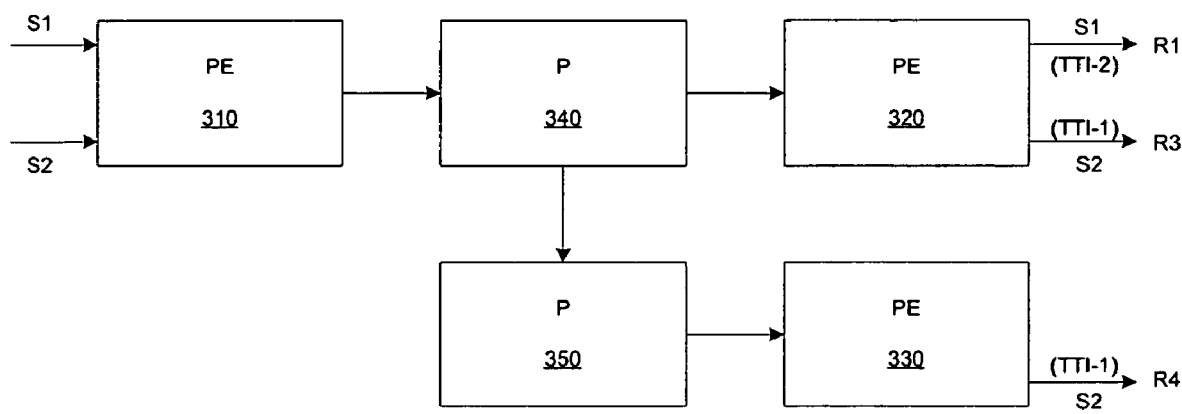

FIG. 6D is a simplified block diagram illustrating the results of modifying the cloned transport tree of FIG. 6C. Transport tree TTI-2 now includes only egress router PE 320, while original transport tree TTI-1 continues to include PE 320 and PE 330.

As will be discussed more fully below, the cloning process described is performed in an atomic manner within the transport network. Such an atomic cloning process can allow for all router elements downstream of the ingress router (in the case of an egress initiated transport tree build), to complete their cloning processing prior to continuing the cloning process at the next upstream network router element. The hierarchical relationship between upstream and downstream nodes guarantees that when the cloning process reaches the root of the transport tree (e. g., the ingress router element) all downstream router elements will have performed the cloning. This ensures that the ingress router element cannot switch a multicast session over to a new transport tree until all of the egress router elements have been included in that new transport tree, thereby preventing a disruption in service to any of the egress router elements.

Figure 7:
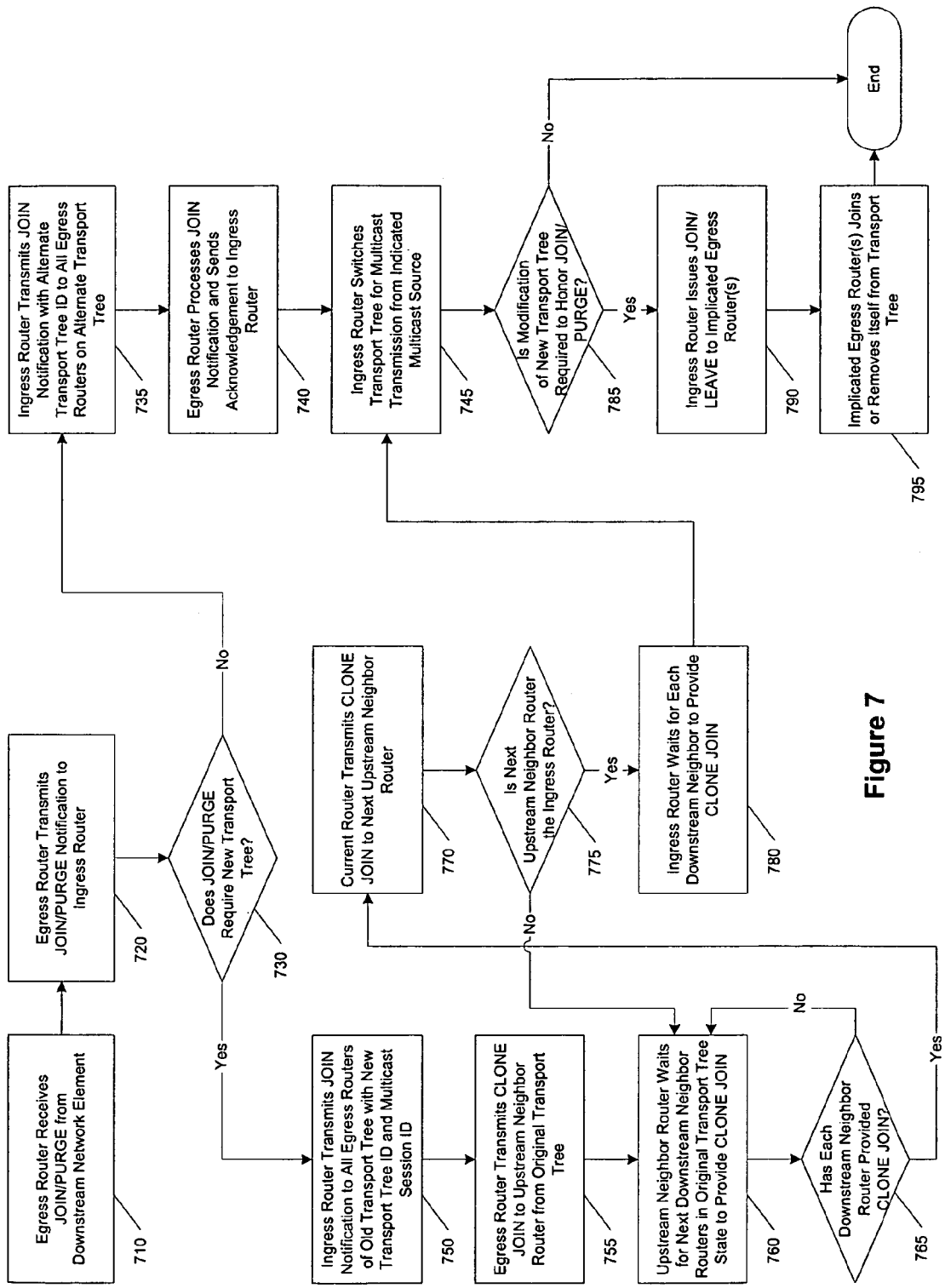
FIG. 7 is a simplified flow diagram illustrating a transport tree clone and modify process in accord with one embodiment of the present invention.

FIG. 7 is a simplified flow diagram illustrating a transport tree clone and modify process in accord with one embodiment of the present invention. Such a clone and modify process can be initiated by an egress router element receiving a multicast session JOIN/PRUNE request from a downstream network element (710). In response to such a request, the egress router element can transmit a notification of the multicast session JOIN/PRUNE to an appropriate ingress router element (720). The ingress router element can then determine whether the multicast session JOIN/PRUNE notification requires the creation of a new transport tree (730). If a new transport tree is not required (that is, an alternate transport tree exists that includes all necessary egress router elements), the ingress router can transmit a transport tree JOIN notification with the multicast session identifier to all egress routers on the alternate transport tree (735). Those egress routers can then process the transport tree JOIN notification and acknowledge completion of the processing to the ingress router (740). Such processing can include associating the multicast session identifier with the identifier of the alternate transport tree. Once the ingress router receives acknowledgement from each egress router, the ingress router can change the mapping of the indicated multicast session to the alternate transport tree and begin transmission onto the alternate transport tree (745).

If the ingress router determines that responding to the multicast session JOIN/PRUNE notification requires a new transport tree (730), the ingress router can transmit a transport tree JOIN notification to all egress routers on the old transport tree wherein that JOIN notification can include a new transport tree identifier and the multicast session identifier (750). In response to receiving that transport tree JOIN notification, each egress router can transmit a CLONE JOIN request to an upstream neighbor router element from the original transport tree (755). The upstream neighbor router element will create a new tree state for the new tree identifier and waits for the next downstream neighbor router element in the original transport tree state to provide a CLONE JOIN (760). The upstream neighbor router element will continue to wait until each downstream neighbor router element has provided a CLONE JOIN (765) and then transmits a CLONE JOIN to the next upstream neighbor routing element (770). Waiting in this manner ensures that each egress router element will have joined the cloned transport tree prior to the cloning process arriving at the ingress router element. The process of creating a new tree state and waiting for each downstream neighbor routing element to provide a CLONE JOIN is continued until the transport tree reaches the ingress router element (775). The ingress router element waits for each of its downstream neighbor router elements in the transport tree to provide a CLONE JOIN (780). Once each downstream neighbor router element to the ingress router element has provided a CLONE JOIN, the ingress router element can begin transmission of the multicast datastream on the new cloned transport tree (745).

The ingress router element can then determine whether modification of the new transport tree is required to honor the original multicast session JOIN/PRUNE notification (785). If not, then the process is completed. If a modification is required, the ingress router can issue a transport tree JOIN or LEAVE notification to the implicated egress router (790). The implicated egress router can then join or remove itself from the transport tree in response to the JOIN/LEAVE notification (795).

Figure 8:
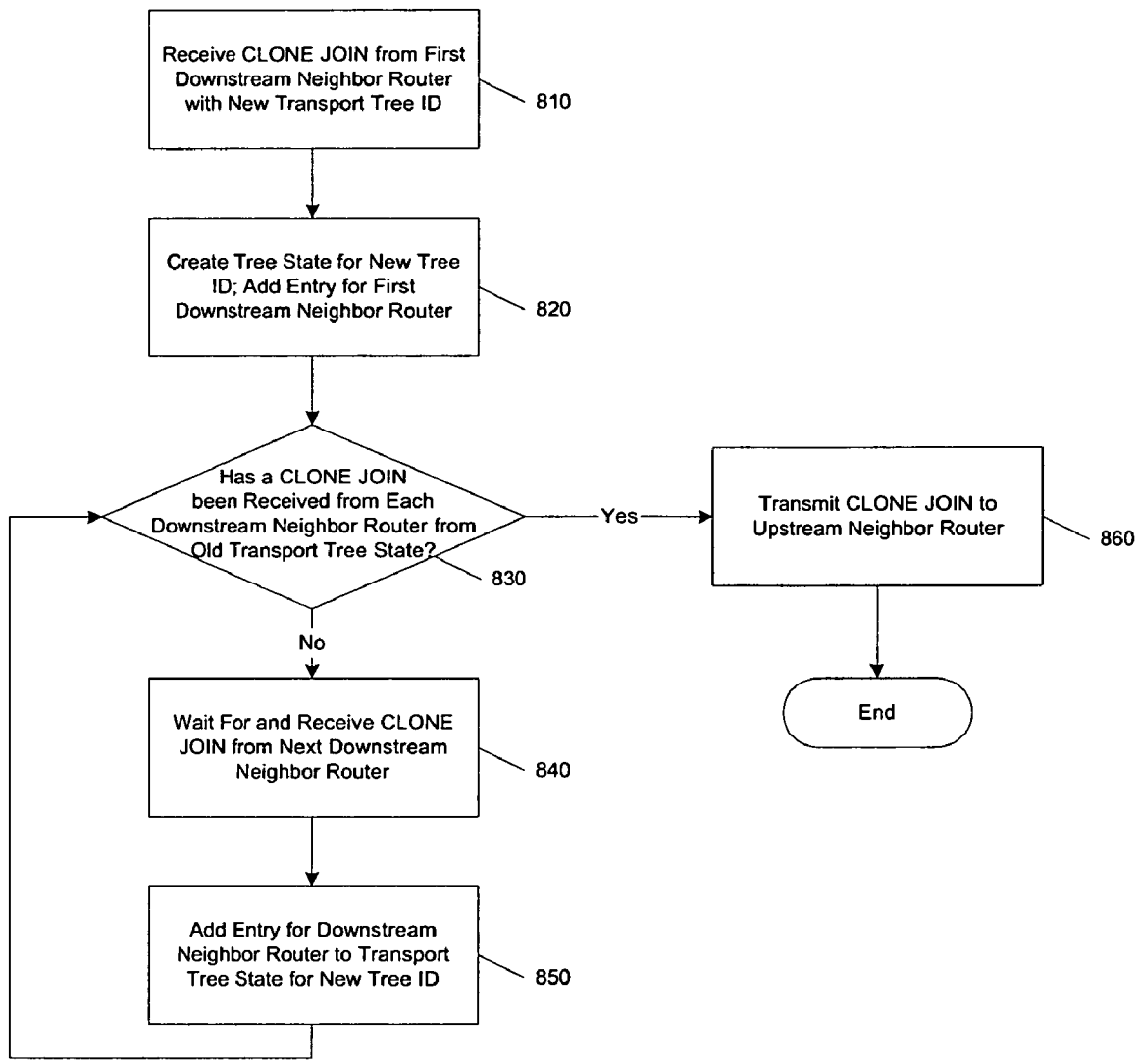
FIG. 8 is a flow diagram illustrating an atomic tree cloning process performed by a router element in accord with one embodiment of the present invention.

FIG. 8 is a flow diagram illustrating details of the atomic tree cloning process performed by a router element in accord with one embodiment of the present invention. This illustrated atomic tree cloning process is a detail of steps 760-770 in FIG. 7. A router element can receive a CLONE JOIN request from a first downstream neighbor router element, wherein the request that includes a new transport tree identifier and the old transport tree identifier (810). The router element can then create a tree state for the new tree identifier and add an entry in that tree state for the first downstream neighbor router element (820). The router element can then determine whether a CLONE JOIN request has been received from each downstream neighbor router element in the old transport tree state (830). If a CLONE JOIN request has not been received from each downstream neighbor router, then the router element will wait to receive a CLONE JOIN from a next downstream neighbor router element (840). Once such a CLONE JOIN request is received, an entry will be added for that downstream neighbor router element to the tree state for the new tree identifier (850). The router element will then perform another check to determine whether a CLONE JOIN has been received from each downstream neighbor router element from the old transport tree state (830) and the process will continue until a CLONE JOIN has been received from each downstream neighbor router element from the old transport tree state. At that point, the router element can transmit a CLONE JOIN request to an upstream neighbor router element, wherein that upstream neighbor router element can be identified from the old transport tree state (860). In this manner, a transport tree can be constructed from egress nodes to the ingress nodes, ensuring that each egress node of the old transport tree is configured to receive the new transport tree.

An Example Transport Network Environment (Mpls)

One example of a transport network within which an embodiment of the present invention can be performed, is a multiprotocol label switching network (MPLS). Other transport network protocols that are also applicable are internet protocol or OS1 layer to tunneling transport networks. A description of MPLS networks is provided below.

In a typical router-based network, OS1 Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OS1 Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. In light of this dual nature, MPLS routers are called label switch routers (LSRs).

In an MPLS network, incoming datastream packets are assigned a label by an edge label switch router (e.g., provider edge router element 260(1)). An edge LSR has one or more network interfaces connected to other LSRs within the transport network and one or more other network interfaces connected to non-MPLS enabled devices (e.g., a customer edge router). The label takes the form of a header created by the edge LSR and used by LSRs within the transport network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). A path, or transport tree, defined by the labels through core LSRs between a pair of edge LSRs is called a label switch path (LSP). Label information is distributed among the LSRs through the use of a label distribution protocol (LDP). Packets are forwarded within the core network along the label switch path where each LSR makes forwarding decisions based solely on the contents of the label. At each hop, an LSR may strip off the existing label and apply a new label which tells the next hop how to forward the packet.

Figure 9:
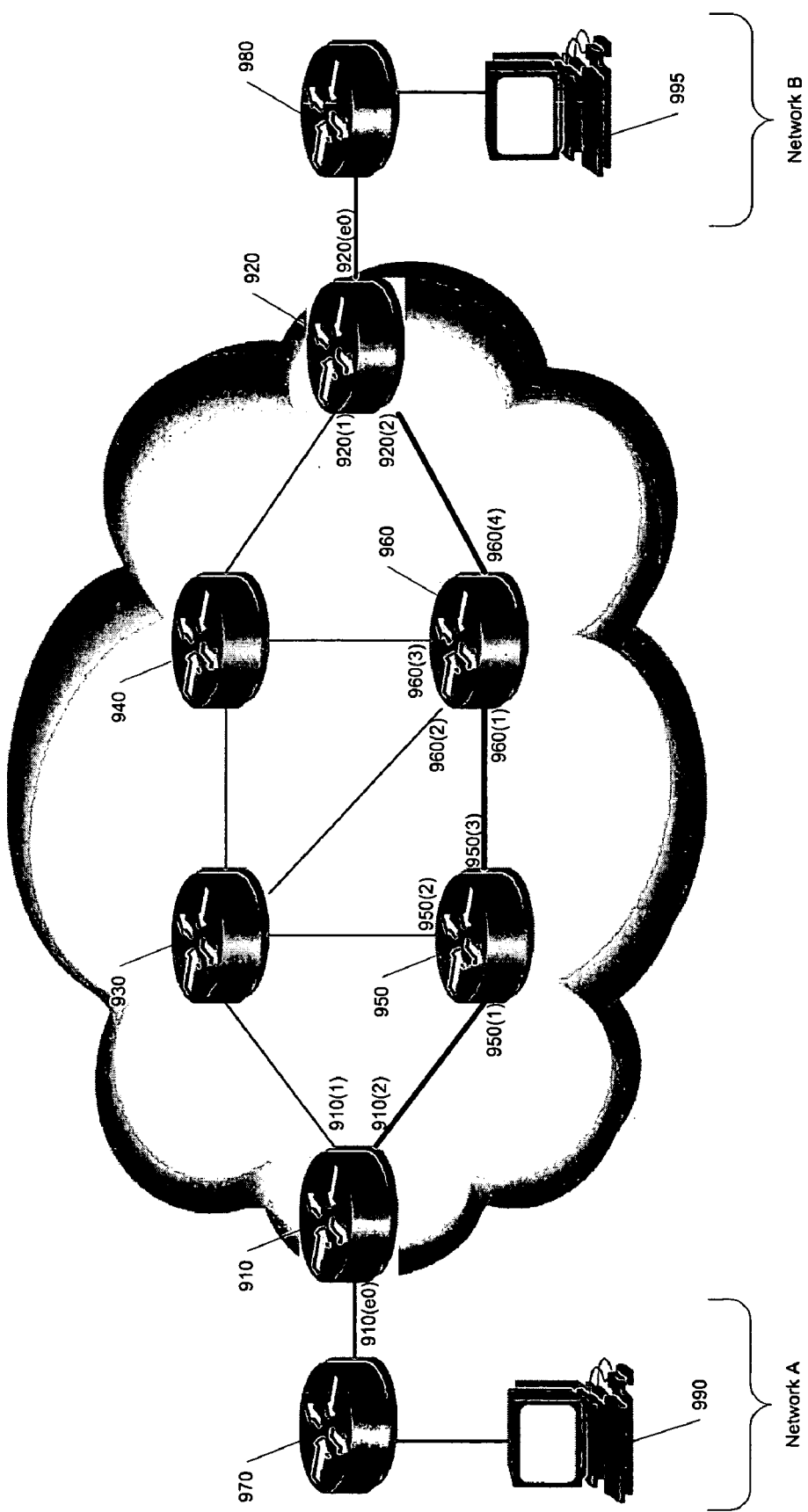
FIG. 9 is a simplified block diagram illustrating a path a datastream can take through an MPLS network.

FIG. 9 is a simplified block diagram illustrating a path a datastream can take through an MPLS network. In FIG. 9, a series of LSRs (edge and core) interconnect, forming a physical path between two network elements, 990 and 995, which are connected to the MPLS network through customer edge routers 970 and 980. An Ethernet frame carrying an IP datagram generated by network element 990 will follow the standard Ethernet format with a normal Layer 2 header followed by a Layer 3 header. Because the destination address resides in a different network, customer edge router 970 forwards a packet including the IP datagran to edge LSR 910. Edge LSR 910 references its internal forwarding table (also known as a forwarding information base (FIB)) and determines that it needs to forward a packet including the IP datagram via interface 910(2) toward edge LSR 920.

The core of the MPLS network includes core LSRs 930, 940, 950, 960, which are coupled, directly or indirectly, to edge LSRs 910 and 920.

The FIB entry for the destination network in ingress edge LSR 910 indicates that edge LSR 910 must include a label with the packet to indicate what path the packet should take on its way to egress edge LSR 920 and from there to destination network element 995. The label can be inserted before the Layer 3 header in the frame passed from edge LSR 910 to the next hop core LSR 950. Core LSR 950 receives the frame at interface 950(1) and determines the presence of the label. Core LSR 950 then treats the packet according to the configuration in its label forwarding information base (LFIB), which directs the core LSR to forward the packet via interface 950(3) and to replace the old incoming label with a new outgoing label. Core LSR 960 will then handle the packet in a similar manner, receiving the packet at interface 960(1) and transmitting the packet via interface 960(4), after having stripped the label added at core LSR 950 and inserting a new label.

Edge LSR 920 is the egress point from the MPLS network for the packet. Edge LSR 920 performs a label lookup in the same way as the previous LSRs, but will have no outgoing label to use. Edge LSR 920 will then strip off all label information and pass a standard packet including the IP datagram to customer edge router 980, which will then transmit the IP frame to network element 995. It should be noted that the LSP between edge LSRs 910 and 920 can take different links than the ones indicated in FIG. 9. The table below illustrates the incoming and outgoing interface and incoming and outgoing label changes that occur at each LSR in the illustrated LSP. Incoming Incoming Destination Outgoing Outgoing

TABLE 1

| Router | Incoming Label | Incoming Interface | Destination Network | Outgoing Interface | Outgoing Label |
|---|---|---|---|---|---|
| 910 | — | 910(e0) | B | 910(2) | 6 |
| 950 | 6 | 950(1) | B | 950(3) | 11 |
| 960 | 11 | 960(1) | B | 960(4) | 7 |
| 920 | 7 | 920(2) | B | 920(e0) | — |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configured to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e. g. , Table 1). Labels are "locally significant" because they are replaced at each hop. Whenever an LSR discovers a neighbor LSR, the two LSRs establish a connection to transfer label bindings.

LDP can exchange subnet/label bindings using one of two methods: downstream unsolicited distribution or downstream-on-demand distribution. Downstream unsolicited distribution disperses labels if a downstream LSR needs to establish a new binding with its neighboring upstream LSR. In downstream-on-demand distribution, a downstream LSR sends a binding upstream only if the upstream LSR requests it. For each router in an upstream LSR's route table, the upstream LSR identifies the next hop for that route. The upstream LSR then issues a request (via LDP) to the downstream (next hop) LSR for a label binding corresponding to the downstream LSR. When the downstream LSR receives the request, the downstream LSR allocates a label, creates an entry in its LFIB with the incoming label set to the newly allocated label, and then the downstream LSR returns a binding between the newly allocated label and the route to the upstream LSR that sent the original request. When the upstream LSR receives the binding information, the upstream LSR creates an entry in its LFIB and sets the outgoing label in the entry to the value received from the downstream LSR. In a network using downstream-on-demand distribution, this process is repeated recursively until the destination is reached.

When an LSR receives a packet with a label, the LSR uses the label for an index search in the LSR's LFIB. Each entry in the LFIB may consist of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software. A forwarding decision is further independent of the label's forwarding granularity; that is the same forwarding algorithm applies to both unicast and multicast. A unicast LFIB entry will have one outgoing label, outgoing interface and outgoing link level information. A multicast entry can have one or more outgoing labels, outgoing interfaces, and outgoing link-level information associated with the one label.

An Example Router

Figure 10:
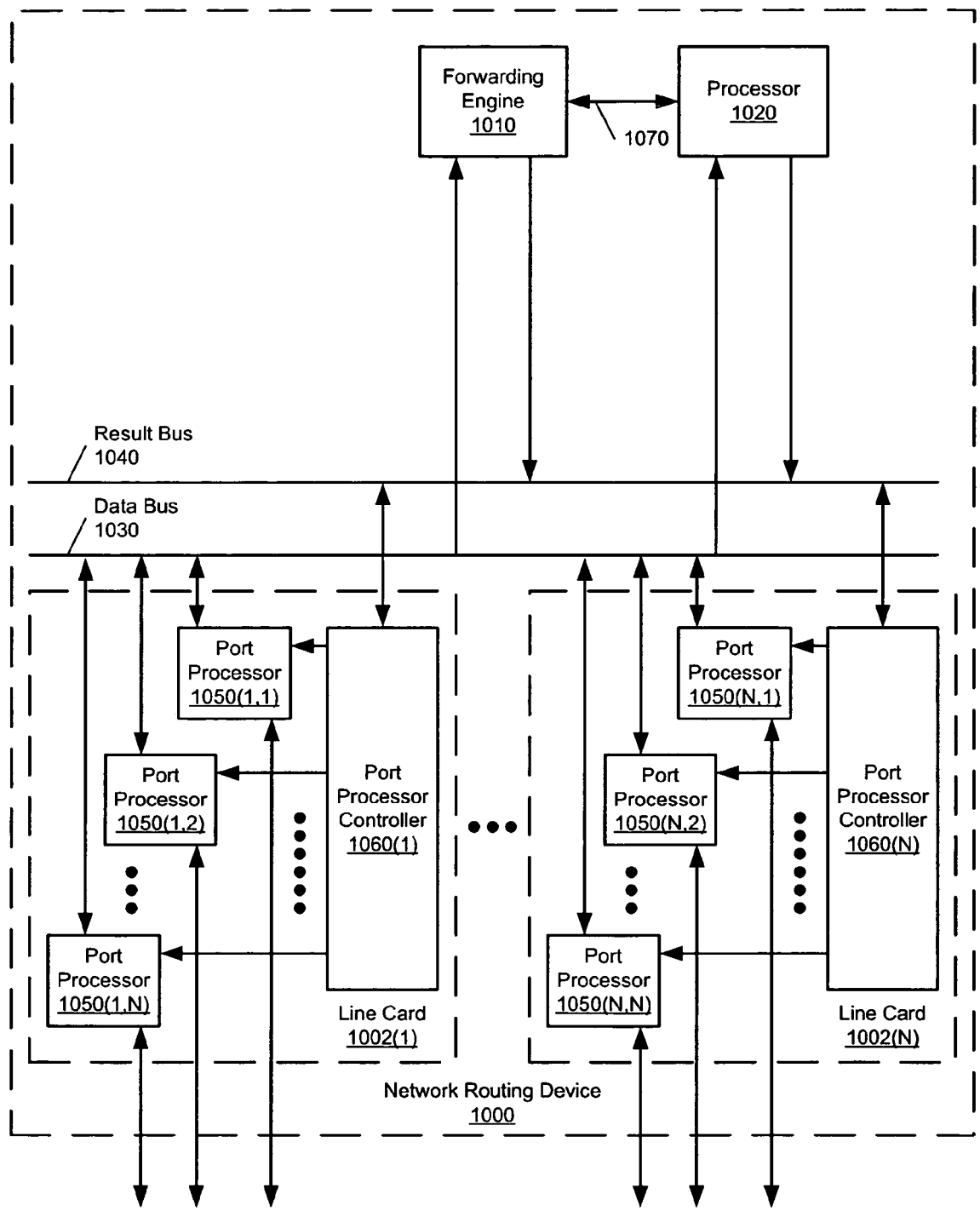
FIG. 10 is a block diagram illustrating a network router element that can be used to implement an embodiment of the present invention.

FIG. 10 is a block diagram illustrating a network router element. In this depiction, network router element 1000 includes a number of line cards (line cards 1002(1)-(N)) that are communicatively coupled to a forwarding engine 1010 and a processor 1020 via a data bus 1030 and a result bus 1040. Line cards 1002(1)-(N) include a number of port processors 1050(l, 1)-(N, N) which are controlled by port processor controllers 1060(1)-(N). It will also be noted that forwarding engine 1010 and processor 1020 are not only coupled to one another via data bus 1030 and result bus 1040, but are also communicatively coupled to one another by a communications link 1070.

When a packet is received, the packet is identified and analyzed by a network router element such as network router element 1000 in the following manner, according to embodiments of the present invention. Upon receipt, a packet (or some or all of its control information) is sent from the one of port processors 1050(1,1)-(N,N) at which the packet was received to one or more of those devices coupled to data bus 1030(e. g. , others of port processors 1050(1,1)-(N, N), forwarding engine 1010 and/or processor 1020). Handling of the packet can be determined, for example, by forwarding engine 1010. For example, forwarding engine 1010 may determine that the packet should be forwarded to one or more of port processors 1050(1,1)-(N,N). This can be accomplished by indicating to corresponding one(s) of port processor controllers 1060(1)-(N) that the copy of the packet held in the given one(s) of port processors 1050(1,1)-(N,N) should be forwarded to the appropriate one of port processors 1050(1,1)-(N,N).

In the foregoing process, network security information can be included in a frame sourced by network routing device 1000 in a number of ways. For example, forwarding engine 1010 can be used to detect the need for the inclusion of network security information in the packet, and processor 1020 can be called into service to provide the requisite network security information. This network security information can be included in the packet during the transfer of the packet's contents from one of port processors 1050(1,1)-(N,N) to another of port processors 1050(1,1)-(N,N), by processor 1020 providing the requisite information directly, or via forwarding engine 1010, for example. The assembled packet at the receiving one of port processors 1050(1,1)-(N,N) can thus be made to contain the requisite network security information.

In addition, or alternatively, once a packet has been identified for processing according to the present invention, forwarding engine 1010, processor 1020 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e. g. , the various elements shown as components of network routing device 1000). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected, " or "operably coupled, " to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method for a network router element to clone a first transport tree state of a first transport tree, the method comprising:

receiving, by the network router element, a first clone request from a first neighbor router element, wherein the first clone request comprises a request to clone the first transport tree state of the first transport tree to a second transport tree state of a second transport tree, the first neighbor router element transmits the first clone request in response to the first neighbor router element receiving a transport tree join notification from a root network router element of the first transport tree, the transport tree join notification is transmitted by the root network router element in response to the root network router element receiving a modification request to modify the first transport tree and determining that no alternate transport tree exists to satisfy the modification request to modify the first transport tree, the first transport tree is a configured communications path, comprising the network router element and traversing a transport network from an ingress router element to one or more egress router elements, and the network router element is configured to transmit data over the first transport tree;

creating the second transport tree state of the second transport tree in response to the first request; and adding a first entry to the second transport tree state, wherein the first entry corresponds to the first neighbor router element.

2. The method of claim 1 further comprising:

waiting for a second clone request from a second neighbor router element, if each entry in the first transport tree state does not have a corresponding entry in the second transport tree state.

3. The method of claim 2, wherein the first clone request comprises:

an identifier for the second transport tree.

4. The method of claim 2 wherein the first neighbor router element is downstream of the network router element in relation to a root of the first transport tree.

5. The method of claim 4 wherein the first transport tree state comprises:

one or more identifiers of one or more corresponding neighbor router elements, wherein the neighbor router elements are downstream of the network router element in relation to the root of the first transport tree.

6. The method of claim 5 further comprising:

transmitting a third clone request to a third neighbor router element, if each entry in the first transport tree state has a corresponding entry in the second transport tree state, wherein the third neighbor router element is upstream of the network router element in relation to the root of the first transport tree.

7. The method of claim 6 wherein the first transport tree state further comprises:

an identifier of the third neighbor router element.

8. The method of claim 5 further comprising:

transmitting a data packet to downstream neighbor router elements corresponding to each entry in the second transport tree state, if each entry in the first transport tree state has a corresponding entry in the second transport tree state, wherein the network router element is a root network router element for the second transport tree.

9. The method of claim 8 wherein the root network router element is an ingress router element for a transport network.

10. The method of claim 9 wherein the transport network is an MPLS network.

11. A router element comprising:

a plurality of network line cards, wherein a first network line card of the plurality of network line cards is configured to receive a first clone request from a first neighbor router element, wherein the first clone request comprises a request to clone a first transport tree state of a first transport tree to a second transport tree state of a second transport tree, the first neighbor router element transmits the first clone request in response to the first neighbor router element receiving a transport tree join notification from a root network router element of the first transport tree, the transport tree join notification is transmitted by the root network router element in response to the root network router element receiving a modification request to modify the first transport tree and determining that no alternate transport tree exists to satisfy the modification request to modify the first transport tree, the first transport tree is a configured communications path, comprising the router element and traversing a transport network from an ingress router element to one or more egress router elements, and the first network line card is configured to transmit data over the first transport tree;

a switch fabric comprising a plurality of ports, wherein each of the plurality of ports is coupled to a corresponding one of the plurality of network line cards, and a first port is coupled to the first network line card;

a memory coupled to the switch fabric and configured to store the first transport tree state of the first transport tree; and a processor coupled to the memory, wherein the processor is configured to create the second transport tree state of the second transport tree in response to the first request;

add a first entry to the second transport tree state, wherein the first entry corresponds to the first neighbor router element.

12. The router element of claim 11 further comprising:

the processor further configured to wait for a second clone request from a second neighbor router element, if each entry in the first transport tree state does not have a corresponding entry in the second transport tree state.

13. The router element of claim 12, wherein the first neighbor router element is downstream of the router element in relation to a root of the first transport tree, and the first transport tree state comprises one or more identifiers of one or more corresponding neighbor router elements, wherein the neighbor router elements are downstream of the router element in relation to the root of the first transport tree.

14. The network element of claim 13 further comprising:

the processor further configured to determine if each entry in the first transport tree state has a corresponding entry in the second transport tree state; and a second network card of the plurality of network cards configured to transmit a third clone request to a third neighbor router element, if each entry in the first transport tree state has a corresponding entry in the second transport tree state, wherein the third neighbor router element is upstream of the network router element in relation to the root of the first transport tree.

15. The network element of claim 13 further comprising:
the processor further configured to determine if each entry in the first transport tree state has a corresponding entry in the second transport tree state; and
a third network card of the plurality of network cards configured to transmit a data packet to downstream neighbor router elements corresponding to each entry in the second transport tree state, if each entry in the first transport tree state has a corresponding entry in the second transport tree state, wherein
the network router element is a root network router element for a second transport tree corresponding to the second transport tree state.

16. A router element comprising:
a memory configured to store a first transport tree state of a first transport tree;
means for receiving, by the router element, a first request from a first neighbor router element, wherein
the first request comprises a request to clone the first transport tree state of the first transport tree to a second transport tree state of a second transport tree,
the first neighbor router element transmits the first clone request in response to the first neighbor router element receiving a transport tree join notification from a root network router element of the first transport tree,
the transport tree join notification is transmitted by the root network router element in response to the root network router element receiving a modification request to modify the first transport tree and determining that no alternate transport tree exists to satisfy the modification request to modify the first transport tree,
the first transport tree is a configured communications path, comprising the router element and traversing a transport network from an ingress router element to one or more egress router elements, and
the router element is configured to transmit data over the first transport tree;
means for creating the second transport tree state of the second transport tree in response to the first request;
means for adding a first entry to the second transport tree state, wherein the first entry corresponds to the first neighbor router element.

17. The router element of claim 16 further comprising:
means for waiting for a second clone request from a second neighbor router element, if each entry in the first transport tree state does not have a corresponding entry in the second transport tree state.

* * * * *